United States Patent
Wainfan et al.

[19]

[11] Patent Number: 5,961,068
[45] Date of Patent: Oct. 5, 1999

[54] AERODYNAMIC CONTROL EFFECTOR

[75] Inventors: Barnaby S. Wainfan, Long Beach; Matthew N. Mrdeza, Whittier, both of Calif.

[73] Assignee: Northrop Grumman Corporation, Los Angeles, Calif.

[21] Appl. No.: 08/956,559

[22] Filed: Oct. 23, 1997

[51] Int. Cl.$^6$ .............................. B64C 1/00; B64C 9/00; B64C 5/06

[52] U.S. Cl. ............................ 244/36; 244/87; 244/91; 244/130

[58] Field of Search ................................ 244/36, 87, 15, 244/130, 91, 45 R; D12/333, 334, 343

[56] References Cited

U.S. PATENT DOCUMENTS

| | | | |
|---|---|---|---|
| D. 196,546 | 10/1963 | Kartveli | D12/333 |
| D. 251,721 | 5/1979 | Stewart et al. | D12/333 |
| D. 314,366 | 2/1991 | Waaland et al. | D12/333 |
| D. 326,081 | 5/1992 | Cathers et al. | D12/333 |
| D. 342,717 | 12/1993 | Mrdeza et al. | D12/333 |
| D. 365,545 | 12/1995 | Wainfan et al. | D12/333 |
| D. 372,218 | 7/1996 | Herzberg et al. | D12/333 |
| D. 394,039 | 5/1998 | Cummings | D12/333 |
| 3,292,881 | 12/1966 | Ricard | D12/333 |
| 3,447,761 | 6/1969 | Whitener et al. | 244/15 |
| 3,968,946 | 7/1976 | Cole | 244/130 |
| 4,025,007 | 5/1977 | Kaniut | 244/15 |
| 4,381,091 | 4/1983 | Pegram | 244/87 |
| 4,579,300 | 4/1986 | Carr | 244/36 |
| 4,691,879 | 9/1987 | Greene | 244/45 R |
| 4,723,214 | 2/1988 | Frei | 364/434 |
| 4,901,947 | 2/1990 | Raymer | 244/12.5 |
| 5,082,204 | 1/1992 | Croston | 244/36 |
| 5,082,207 | 1/1992 | Tulinius | 244/76 R |
| 5,366,180 | 11/1994 | Wainfan et al. | 244/45 R |
| 5,388,788 | 2/1995 | Rudolph | 244/87 |
| 5,836,549 | 11/1998 | Bushman | 244/130 |

OTHER PUBLICATIONS

Anderson, John D. Jr., "Introduction to Flight," Third Edition. McGraw–Hill Book Company, New York: p. 193. Jan. 1989.

"Jane's All The World's Aircraft 1977–78", London, England, p. 301. Nov. 1978.

*Primary Examiner*—Charles T. Jordan
*Assistant Examiner*—Theresa M. Wesson
*Attorney, Agent, or Firm*—Terry J. Anderson; Karl J. Hoch, Jr.

[57] ABSTRACT

An aerodynamic control system for an aircraft comprises a pair of low-aspect-ratio strakes integral with the fuselage, each of the strakes being substantially co-planar with an associated one of the wings and extending between a leading region generally blended with the trailing edge of the wing, a trailing edge and an outer edge. An aft airfoil is pivotally mounted to the trailing edge of each of the strakes movable between an extreme positive angle of attack position and an extreme negative angle of attack position. The aft airfoil includes an inner airfoil member which is laterally coextensive with said trailing edge of said associated strake and an outer airfoil member integral with the inner airfoil member which extends laterally beyond the outer edge of the associated strake. In one embodiment, the outer and inner airfoil members are substantially co-planar. In other embodiments, the outer airfoil member may be canted either upwardly or downwardly with respect to the inner airfoil member. In still other embodiments, the trailing edges of the strakes may either extend substantially perpendicular to the longitudinal axis of the fuselage, or extend forwardly or rearwardly with increasing distance away from the fuselage. Also, the strakes may have the construction of chines which are smoothly blended with the outer surface of the fuselage.

17 Claims, 4 Drawing Sheets

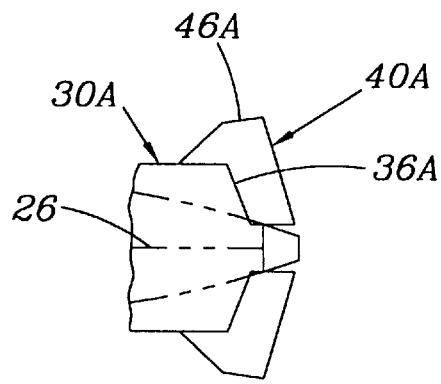
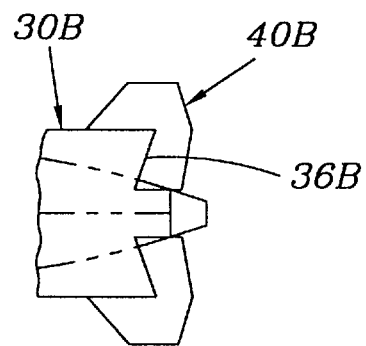
FIG. 9  FIG. 10
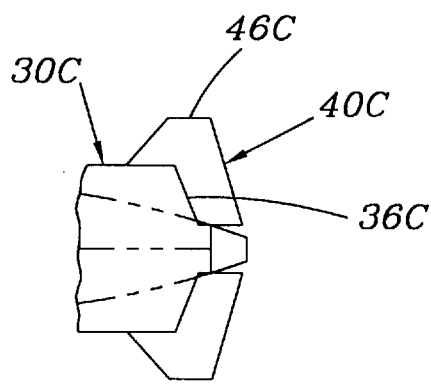
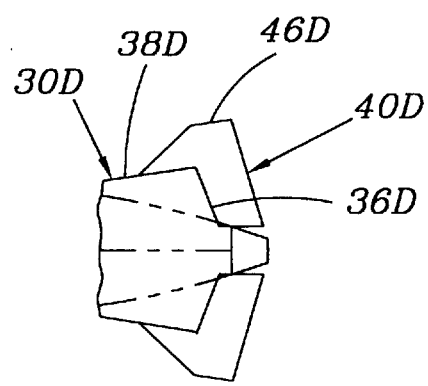
FIG. 11  FIG. 12

AERODYNAMIC CONTROL EFFECTOR

BACKGROUND OF THE INVENTION

1. Field of the Invention

The present invention relates generally to an improved aerodynamic control effector for aircraft and, more particularly, to a control effector which provides increased aerodynamic control power per unit area, and greater control power at high angles of attack than conventional control effectors. Tie invention can be used to generate pitching, rolling, and yawing moments aerodynamically by collective and/or differential deflection of the incorporated moveable aerodynamic surfaces.

2. Description of the Prior Art

It is a continuing challenge for aircraft designers to improve the aerodynamic control and maneuvering capability of aircraft. Improving control and maneuvering is especially important for supersonic fighter aircraft. This is because they have special requirements related to their ability to "track" or "aim" the fuselage in a particular desired direction. Associated with this is a further requirement to change "tracking" or "aiming" direction quickly which is commonly called maneuverability.

Maneuvering flight means flight at high angles of attack. In that flight regime aircraft experience a severe degradation of aerodynamic control, and the large empennages typically associated with fighter aircraft are the usual design solutions to cope with these deficiencies. All-moving horizontal or V tails of the type which are currently used on high-speed military aircraft tend to lose control power at high angles of attack, due to aerodynamic stall of the tail surface. At angles of attack in excess of 30 to 40 degrees, the ability of a conventional tail to generate nose-down moments to drive the angle of attack down degrades to nil.

Typical of the prior art in this regard is U.S. Pat. No. 5,366,180 to Wainfan and Mrdeza which discloses a pair of foreplanes mounted on the forward portion of the aircraft together with a pair of co-planar strakes extending between the trailing edge of an associated foreplane and the leading edge of an associated wing. The patented combination controls forebody vortex flow, while the present invention, as will be explained, generates control power by manipulating the flow leaving the aft portion of the aircraft. That is, the movable portion of the patented invention is the forward portion of the device, while the movable portion of the present invention is the aft portion thereof.

U.S. Pat. No. 5,082,207 to Tulinius is primarily concerned with using flexibility of the wing of the aircraft for control and discloses a system for controlling an aircraft by aeroelastic deflections of the wings which is effective beyond control surface reversal. The control surfaces 34, 36 in FIG. 1 of the patent are the only components of the patented construction which are in any way similar to the present invention. They differ in that they are entirely behind the fixed portion of the body, and have no overhanging or projecting portions as is the case for the present invention. Additionally, the control surfaces 34, 36 are entirely co-planar with the aft portion of the fuselage of the aircraft, while in some embodiments of the present invention, the outboard portion of the control effector is not so configured.

U.S. Pat. No. 4,901,947 to Raymer discloses a short/vertical takeoff and landing aircraft including an engine mounted in the airframe in a reversed position having an inlet facing toward the rear of the aircraft and the exhaust nozzle assembly having a pair of exhaust nozzles facing toward the front. The exhaust nozzles extend outward from the sides of the aircraft and are rotatable from a vertically downward position to provide upward thrust to a horizontally rearward direction to provide forward thrust. The configuration disclosed has no control effectors which resemble the present invention.

U.S. Pat. No. 4,723,214 to Frei discloses a control system for optimization of vehicle performance which includes a strake flap but lacks the protruding portion of the movable control effector which is a feature of the present invention. Additionally, each strake flap is entirely co-planar with the aft portion of the body of the aircraft, while in some embodiments of the present invention, the outboard portion of the control effector is not co-planar with the fixed portion of the body.

U.S. Pat. No. 4,381,091 to Peagram discloses a strake fixed to the fuselage immediately forward of a horizontal stabilizer, but is in no way attached nor hinged to the movable tail surface. In the present invention the movable control surface is attached to the fixed portion by a hinge, preventing a gap from forming between the fixed and movable portions when the control surface is deflected, as would be the case for the system disclosed in the patent.

U.S. Pat. No. 4,691,879 to Greene discloses an aircraft including multiple airfoils and engines. The tail surface 44, 46 is essentially a conventional swept horizontal tail, and is not integrated with the body in the manner of the present invention. Additionally, the leading edge of a movable portion 46 is co-linear with the leading edge of a fixed portion. In the present invention, the exposed edge of the fixed portion is oriented essentially fore and aft, and its front edge is contiguous with the trailing edge of the wing. Additionally, the fixed and movable portions of the tail of the patented constriction are completely co-planar, while in some embodiments of the present invention, the outboard portion of the control effector is not co-planar with the fixed portion of the horizontal surface.

It was with knowledge of the foregoing that the present invention has been conceived and is now reduced to practice.

SUMMARY OF THE INVENTION

The present invention relates to an aerodynamic control system for an aircraft and comprises a pair of low-aspect-ratio strakes integral with the fuselage, each of the strakes being substantially co-planar with an associated one of the wings and extending between a leading region generally blended with the trailing edge of the wing, a trailing edge and an outer edge. An aft airfoil is pivotally mounted to the trailing edge of each of the strakes movable between an extreme positive angle of attack position and an extreme negative angle of attack position. The aft airfoil includes an inner airfoil member which is laterally coextensive with the trailing edge of the associated strake and an outer airfoil member integral with the inner airfoil member which extends laterally beyond the outer edge of the associated strake. In one embodiment, the outer and inner airfoil members are substantially co-planar. In other embodiments, the outer airfoil member may be canted either upwardly or downwardly with respect to the inner airfoil member. In still other embodiments, the trailing edges of the strakes may either extend substantially perpendicular to the longitudinal axis of the fuselage, or extend forwardly or rearwardly with increasing distance away from the fuselage. Also, the strakes may have the constriction of chines which are smoothly blended with the outer surface of the fuselage.

In another manner of speaking, the current invention is a control surface which, when deflected trailing-edge-down at high angles of attack, dams the airflow, generating a region of high aerodynamic pressure on the lower surface of the aft portion of the airplane. This high pressure generates an upward force on the aft body, causing a nose-down pitching moment. Testing has shown that the current invention is 2 to 4 times as effective per unit area as a conventional tail at angles of attack above 30 degrees, and is slightly more effective than a conventional tail at lower angles of attack.

More specifically, the invention comprises:

(1) A pair of low-aspect-ratio strakes or blended chines, oriented substantially horizontal and affixed to the aft portions of the sides of the fuselage. The strakes are coplanar, or nearly coplanar, with the wing. The forward edges of the strakes intersect the trailing edges of the wing; and (2) Moveable surfaces hinged to the trailing edges of the strakes, the surfaces including:

an inner portion, which extends from the side of the fuselage, or from an exposed inner edge, to the outer edge of the strake, the inner portion being coplanar with the strake and attached to the trailing edge of the strake by a hinge, and an outer portion, which is attached to the inner portion and extends outboard of the outer edge of the strake; the outer portion may be coplanar with the inner portion, or may be canted up or down about a substantially fore-and-aft axis.

A primary feature of the invention, then, is the provision of an improved aerodynamic control effector for aircraft.

Another feature of the invention is the provision of a control effector for an aircraft which provides increased aerodynamic control power per unit area, and greater control power at high angles of attack than conventional control effectors.

Still another feature of the invention is the provision of an aircraft which comprises a pair of low-aspect-ratio strakes integral with the fuselage, each of the strakes being substantially co-planar with an associated one of the wings and extending between a leading region generally blended with the trailing edge of the wing, a trailing edge and an outer edge and an aft airfoil pivotally mounted to the trailing edge of each of the strakes movable between an extreme positive angle of attack position and an extreme negative angle of attack position.

A further feature of the invention is the provision of such a construction in which the aft airfoil includes an inner airfoil member which is laterally coextensive with the trailing edge of the associated strake and an outer airfoil member integral with the inner airfoil member which extends laterally beyond the outer edge of the associated strake.

Yet a further feature of the invention is the provision of such a construction in which, in different embodiments, the outer and inner airfoil members are substantially co-planar, or the outer airfoil member is canted either upwardly or downwardly with respect to the inner airfoil member, or the trailing edges of the strakes either extend substantially perpendicular to the longitudinal axis of the fuselage, or extend forwardly or rearwardly with increasing distance away from the fuselage.

Yet another feature of the invention is the provision of such a construction in which the strakes are actually chines which are smoothly blended with the outer surface of the fuselage.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

FIGS. 9, 10, 11, and 12 are detail top plan views, similar to FIG. 2 and illustrating modifications of components illustrated in FIG. 2.

DETAILED DESCRIPTION OF THE PREFERRED EMBODIMENTS

Figure 1:
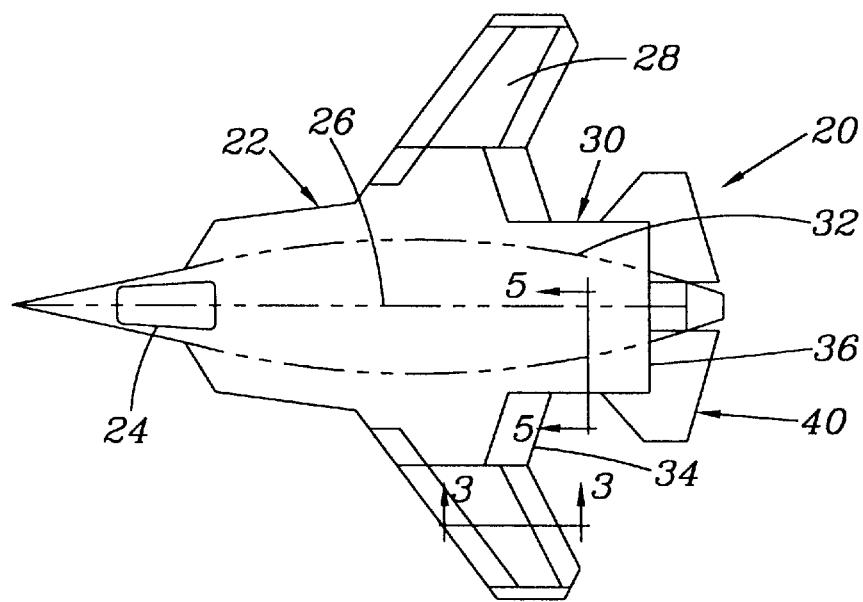
FIG. 1 is a top plan view of a high performance aircraft embodying the aerodynamic control system of the invention.
Figure 2:
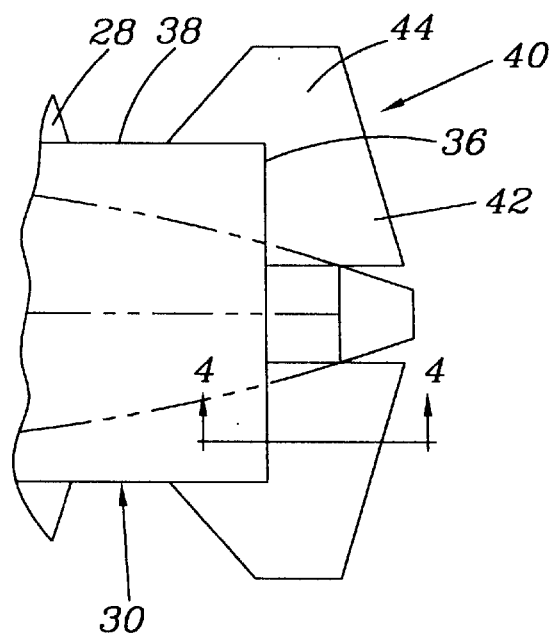
FIG. 2 is a detail top plan view illustrating a portion of FIG. 1.
Figure 3:
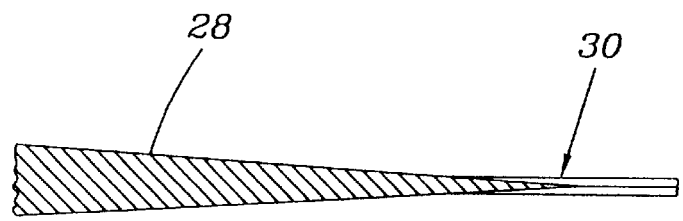
FIG. 3 is a cross section view taken generally along line 3—3 in FIG. 1.

Turn now to the drawings and, initially, to FIGS. 1, 2 and 3 which illustrate an aerodynamic control system 20 for an aircraft 22. In customary fashion, the aircraft 22 includes a fuselage 24 having a fore and aft extending longitudinal axis 26 and laterally, or spanwise, extending wings 28.

The aerodynamic control system 20 includes a pair of low-aspect-ratio strakes 30 which are integral with the fuselage. Each of the strakes is substantially co-planar with its associated wing and extends between a leading region 32 generally blended with a trailing edge 34 of the wing, its own trailing edge 36 and a longitudinally extending outer edge 38.

Figure 4:
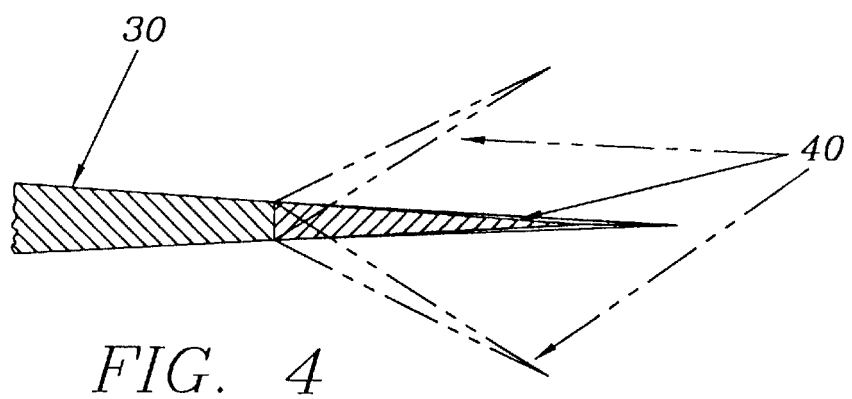
FIG. 4 is a cross section view taken generally along line 4—4 in FIG. 2 and illustrating different positions of a component of the invention.

A aft airfoil assembly 40 is pivotally mounted in a suitable manner to the trailing edge 36 of each of the strakes 30 and, as seen in FIG. 4 is movable between extremes of a first positive angle of attack position (as indicated by dashed lines) and a second negative angle of attack position (as indicated by dash-dot lines). Viewing especially FIG. 2, the aft airfoil assembly 40 includes an inner airfoil member 42 which is laterally, or spanwise, coextensive with the trailing edge 36 of its associated strake and an outer airfoil member 44 integral with the inner airfoil member which extends laterally beyond the outer edge 38 of its associated strake.

Figure 5:
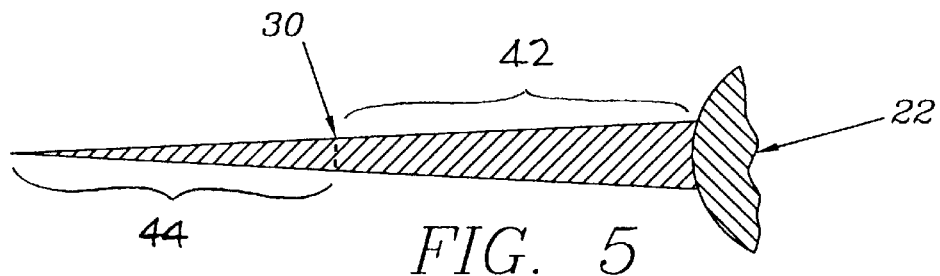
FIG. 5 is a cross section view taken generally along line 5—5 in FIG. 1.
Figure 6:
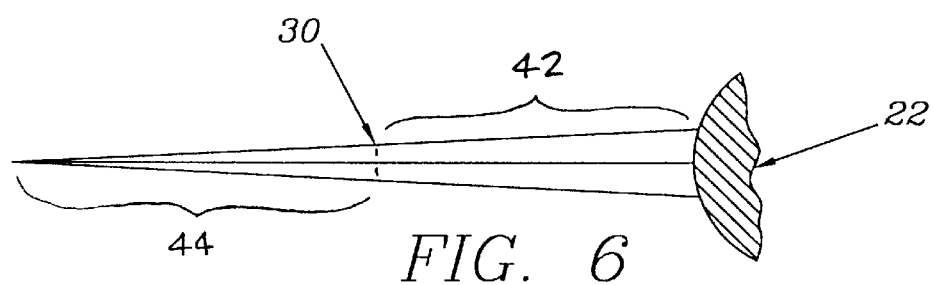
FIG. 6 is a detail elevation view of the component illustrated in FIG. 5.
Figure 7:
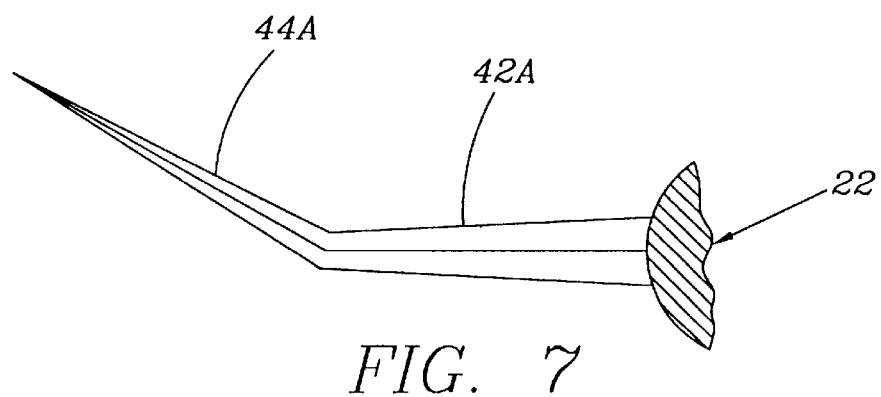
FIGS. 7 and 8 are detail elevation views, respectively, illustrating modifications of the component illustrated in FIGS. 5 and 6.
Figure 8:
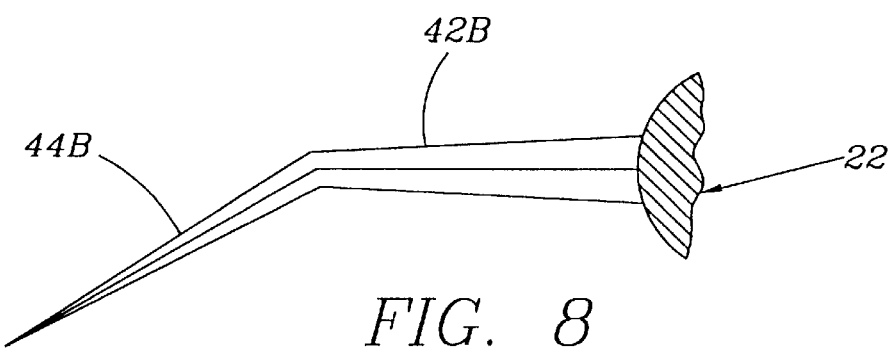

In one embodiment, as seen in FIGS. 5 and 6, the outer airfoil member 44 is substantially co-planar with the inner airfoil member 42. In another embodiment of the invention, as seen in FIG. 7, an outer airfoil member 44A is canted upwardly with respect to an inner airfoil member 42A. In still another embodiment of the invention as seen in FIG. 8, an outer airfoil member 44B is canted downwardly with respect to an inner airfoil member 42B.

Other embodiments of the invention regard the planform of the aft airfoil assembly. As seen in FIGS. 1 and 2, the trailing edge 36 of each of the strakes 30 extends substantially perpendicular to the longitudinal axis 36 of the fuselage 24. As seen in FIG. 9, a trailing edge 36A of each of a pair of modified strakes 30A extends forwardly with increasing distance away from the longitudinal axis of the fuselage and the shape of a modified aft airfoil assembly 40A conforms in a suitable manner to that of the modified strakes. In this instance, an extreme tip end 46A may be skewed so as to extend farther and farther away from the longitudinal axis 26 with increasing distance in an aft direction. As seen in FIG. 10, a trailing edge 36B of each of a pair of otherwise modified strakes 30B extends rearwardly with increasing distance away from the longitudinal axis of the fuselage and the shape of a modified aft airfoil assembly 40B again conforms in a suitable manner to that of the modified strakes. As seen in FIG. 11, a trailing edge 36C of each of a pair of modified strakes 30C extends forwardly with increasing distance away from the longitudinal axis of the fuselage and the shape of a modified aft airfoil assembly 40C conforms in a suitable manner to that of the modified strakes while an extreme tip end 46C of the modified aft airfoil assembly may remain parallel to the longitudinal axis 26 of the aircraft. As seen in FIG. 12, a trailing edge 36D of each of a pair of modified strakes 30D extends forwardly with increasing distance away from the longitudinal axis of the fuselage and the shape of a modified aft airfoil assembly 40A conforms in a suitable manner to that of the modified strakes. In this instance, an outer edge 38D of a strake 30D is skewed so as to extend farther and farther away from the longitudinal axis 26 with increasing distance in an aft direction and an extreme tip end 46D may be similarly skewed.

Figure 13:
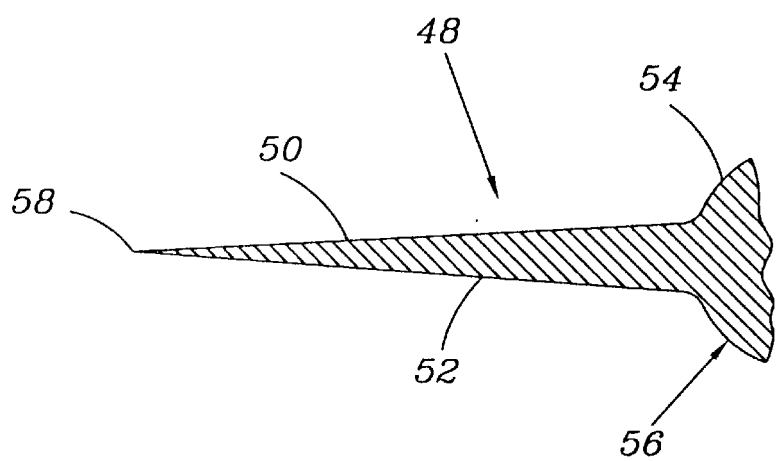
FIG. 13 is a detail elevation view, in section, similar to FIG. 5, but illustrating a modified construction of the invention.

In yet another embodiment of the invention, as seen in FIG. 13, the strakes 30 may be modified to take on substantially the form of chines 48. That is, each chine 48 has upper and lower surfaces 50, 52, respectively, which are faired into a contoured outer surface 54 of a modified fuselage 56 of an aircraft, the upper and lower surfaces merging in a fore and aft direction along an outer edge 58 laterally (or spanwise) spaced from the fuselage. Such a construction serves to eliminate undesirable aerodynamic interference effects between the strake and the fuselage of the aircraft and, further, increases the useful payload of the aircraft by enlarging its volume. This enables the aircraft to carry a heavier payload of fuel, for example.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. An aerodynamic control system for an aircraft including a fuselage having a fore and aft extending longitudinal axis and wings extending laterally, transverse of the longitudinal axis, said aerodynamic control system comprising:

a pair of low-aspect-ratio strakes integral with the fuselage, each of the strakes being substantially co-planar with the wing and extending between a leading region generally blended with the trailing edge of an associated wing, a trailing edge and a longitudinally extending outer edge; and aft airfoil means pivotally mounted to the trailing edge of each of said strakes movable between a first positive angle of attack position and a second negative angle of attack position, said aft airfoil means including:

an inner airfoil member which is laterally coextensive with said trailing edge of said associated strake; and an outer airfoil member integral with said inner airfoil member, said outer airfoil member extending laterally beyond said outer edge of said associated strake.

2. An aerodynamic control system as set forth in claim 1 wherein said outer airfoil member is substantially co-planar with said inner airfoil member.

3. An aerodynamic control system as set forth in claim 1 wherein said outer airfoil member is canted upwardly with respect to said inner airfoil member.

4. An aerodynamic control system as set forth in claim 1 wherein said outer airfoil member is canted downwardly with respect to said inner airfoil member.

5. An aerodynamic control system as set forth in claim 1 wherein said trailing edge of each of said strakes extends substantially perpendicular to the longitudinal axis of the fuselage.

6. An aerodynamic control system as set forth in claim 1 wherein said trailing edge of each of said strakes extends forwardly with increasing distance away from the fuselage.

7. An aerodynamic control system as set forth in claim 1 wherein said trailing edge of each of said strakes extends rearwardly with increasing distance away from the fuselage.

8. An aerodynamic control system as set forth in claim 1 wherein each of said strakes has upper and lower surfaces, respectively, which are faired into the contoured outer surface of the fuselage, said upper and lower surfaces merging in a fore and aft direction along said outer edge laterally spaced from the fuselage.

9. In combination with an aircraft including a fuselage having a fore and aft extending longitudinal axis and wings including leading and trailing edges extending laterally, transverse of the longitudinal axis, an aerodynamic control system comprising:

a pair of low-aspect-ratio strakes integral with said fuselage, each of said strakes being substantially co-planar with an associated one of said wings and extending between a leading region generally blended with said trailing edge of an associated one of said wings, a trailing edge and an outer edge; and aft airfoil means pivotally mounted to said trailing edge of each of said strakes movable between a first positive angle of attack position and a second negative angle of attack position, said aft airfoil means including:

an inner airfoil member which is laterally coextensive with said trailing edge of said associated strake; and an outer airfoil member integral with said inner airfoil member, said outer airfoil member extending laterally beyond said outer edge of said associated strake.

10. A combination as set forth in claim 9 wherein said outer airfoil member is substantially co-planar with said inner airfoil member.

11. A combination as set forth in claim 9 wherein said outer airfoil member is canted upwardly with respect to said inner airfoil member.

12. A combination as set forth in claim 9 wherein said outer airfoil member is canted downwardly with respect to said inner airfoil member.

13. A combination as set forth in claim 9 wherein said trailing edge of each of said strakes extends substantially perpendicular to the longitudinal axis of said fuselage.

14. A combination set forth in claim 9 wherein said trailing edge of each of said strakes extends forwardly with increasing distance away from said fuselage.

15. An aerodynamic control system as set forth in claim 9 wherein said trailing edge of each of said strakes extends rearwardly with increasing distance away from said fuselage.

16. An aerodynamic control system as set forth in claim 9 wherein said outer edge of each of said strakes extends laterally away from said fuselage with increasing distance in an aft direction; and wherein said trailing edge of each of said strakes extends forwardly with increasing distance away from said fuselage.

17. An aerodynamic control system as set forth in claim 9 wherein said fuselage has a contoured outer surface; and wherein each of said strakes has upper and lower surfaces, respectively, which are faired into said outer surface of said fuselage, said upper and lower surfaces merging in a fore and aft direction along said outer edge laterally spaced from said fuselage.

\* \* \* \* \*